United States Patent [19]
Rosensweig

[11] 3,734,578
[45] May 22, 1973

[54] MAGNETIC FLUID PNEUMATIC BEARINGS

[75] Inventor: Ronald E. Rosensweig, Lexington, Mass.

[73] Assignee: Ferrofluidics Corporation, Burlington, Mass.

[22] Filed: Oct. 6, 1971

[21] Appl. No.: 186,926

Related U.S. Application Data

[63] Continuation-in-part of Ser. No. 5,167, Jan. 23, 1970, Pat. No. 3,612,630.

[52] U.S. Cl...................................................308/10
[51] Int. Cl..............................................F16c 39/06
[58] Field of Search.............................308/10; 74/5

[56] References Cited

UNITED STATES PATENTS 3,530,728   9/1970   Evans.........................................74/5
3,384,427   5/1968   McHugh....................................308/10
3,629,753   12/1971  Kawabe.....................................308/10

Primary Examiner—R. Skudy
Attorney—Richard P. Crowley et al.

[57] ABSTRACT

A bearing assembly which includes a pin disposed within a housing and a magnetic fluid seals a fluid bearing pad between the outer surface of the pin and the inner surface of the housing. The sealed fluid bearing pad provides a pneumatic action in response to thrust forces acting on either the housing or the pin. A plurality of magnetic fluid rings are disposed externally of the sealed bearing pad and between the surfaces of the pin and housing to provide a radial restoring force between the pin and the housing when an offsetting force acts on either the pin or the housing. The rings serve an additional function in that they also provide a multi-stage seal for the fluid bearing pad.

25 Claims, 6 Drawing Figures 3,734,578

MAGNETIC FLUID PNEUMATIC BEARINGS

CROSS-REFERENCE TO RELATED APPLICATION

This application is a continuation-in-part of my co-pending application, Ser. No. 5,167, filed Jan. 23, 1970 (now U.S. Pat. No. 3,612,630).

BACKGROUND OF THE INVENTION

Hydrostatic bearings are generally characterized by having no mechanical friction at all speeds and a fluid friction which approaches zero as the bearing speed approaches zero. Hydrostatic bearings are generally complex to construct and operate since a fluid flow of a gas or a liquid must be provided with the attendant requirement for pumps, orifice controls, valves, conduits, energy sources, etc.

In my copending application, Ser. No. 5,167 (now U.S. Pat. No. 3,612,630), a fluid bearing pad or pads are captured between two surfaces such as first and second surfaces having relative movement one with respect to the other. The pad is sealed between the surfaces by providing a perimeter or periphery of increased magnetic flux along one of said surfaces and a magnetic fluid is positioned along said periphery. The magnetic fluid contacts the other surface in sealing relationship and seals the bearing pad within the predetermined area defined by the periphery of the magnetic fluid and allows for relative movement of the surfaces one to the other. The invention disclosed in the above-cited application in various embodiments, therefore, includes bearing pads which provide radial and/or thrust support between surfaces. The aforementioned invention overcame, when employed in bearing assemblies analogous to hydrostatic bearings, the difficulties incurred in the prior art with hydrostatic bearings.

Defining bearing pads between two surfaces (particularly between curved surfaces, such as to provide radial support) is not always practical because of the additional steps required in the fabrication. The use of a magnetic fluid in a bearing environment which magnetic fluid per se would provide a restoring force in response to a thrust and/or radial force applied to either or both of the surfaces would thus be advantageous.

SUMMARY OF THE INVENTION

When a magnetic fluid is positioned in a magnetic field, it assumes a particular geometric configuration which is dependent in part upon the composition of the magnetic fluid and the strength and configuration of the lines of flux emanating from the magnetic source. While positioned in the magnetic field, the magnetic fluid may be considered as elastic, such that any force which tends to deform the configuration of the positioned magnetic fluid in the magnetic field is repelled by the magnetic fluid seeking to maintain its shape and thus the magnetic fluid provides a restoring force. For a further discussion of the properties of magnetic fluids, see Progress in Ferrohydrodynamics, R. E. Rosensweig, Industrial Research, October 1970; Buoyancy and Stable Levitation of a Magnetic Body Immersed in a Magnetizable Fluid, R. E. Rosensweig, Nature, Volume 210, No. 5036, pp. 613–614, May 7, 1966; Magnetic-Fluid Seals, R. E. Rosensweig, et al., Machine Design, Mar. 28, 1968; and Ferrohydrodynamics, R. E. Rosensweig, The Encyclopedic Dictionary of Physics, Pergamom Press, 1971, Supplemental Volume 14.

The present invention is directed to the use of a magnetic fluid in a hybrid bearing environment which magnetic fluid is positioned in a zone of magnetic flux between two surfaces and provides a restoring force in response to a force applied to either of the surfaces. This zone of positioned magnetic fluid is employed in combination with a sealed fluid pad, which pad provides a restoring force in response to a force acting on either of said surfaces, and to a method of making the same.

The invention in one embodiment is directed to a magnetic fluid pneumatic bearing assembly and a method of making the same wherein a bearing pad is sealed between two surfaces by a periphery of magnetic fluid to support a load and additionally magnetic fluid is positioned in one or more zones between the two surfaces which zones of magnetic fluid provide a restoring force in response to a load on either of said surfaces.

The invention in a preferred embodiment is directed to a pin-housing assembly wherein the housing is suspended free from mechanical contact with the pin creating a low-friction bearing free of wear. A bearing pad is sealed between the pin and the housing which bearing pad is adapted to receive thrust forces whereby a pneumatic force is created to support such thrust forces or loads, and a plurality of magnetic fluid rings are positioned between the pin and the housing, each of the magnetic fluid rings adapted to provide a radial restoring force between the pin and the housing. A further aspect of the invention is the location of the magnetic fluid which defines the periphery of the bearing pad between the pin and the housing such that the magnetic fluid is not substantially affected by direct axial thrust forces. In the assembly the pin may be stationary while the housing rotates; the housing may be stationary while the pin rotates; or both the pin and the housing may rotate in the same or opposite directions.

Because the magnetic fluid and fluid in the bearing pads are both fluids, the pin is perfectly free to rotate without contacting the housing. The magnetic fluid rings serve two functions in that they provide additional seals for the bearing pad and provide radial restoring forces between the pin and the housing.

The invention provides a bearing assembly which comprises in combination: a first element having a first surface; a second element having a second surface spaced apart from the first surface, said surfaces adapted for relative movement one to the other; means on one of said surfaces to position a first magnetic fluid along said surface in a periphery, the magnetic fluid adapted to contact the other surface in sealing relationship; a fluid-bearing pad sealed between said surfaces and the periphery of the magnetic fluid; and means on one of said surfaces to position a second magnetic fluid between said surfaces and said means external of the periphery of the first magnetic fluid to provide a restoring force to said surfaces when a force acts on either of said surfaces.

The method of my invention includes: providing a first element having a first surface; providing a second element having a second surface spaced apart from the first surface; establishing a periphery of magnetic flux along one of said surfaces; positioning a magnetic fluid along said periphery of magnetic flux; contacting the other of said surfaces in sealing relationship with the magnetic fluid; sealing a fluid bearing pad between the surfaces and the periphery of the magnetic fluid; establishing a zone of magnetic flux on one of said surfaces external of the periphery of magnetic flux; positioning a magnetic fluid at said zone, the magnetic fluid adapted to provide a restoring force when a force acts upon either of said surfaces.

DESCRIPTION OF THE PREFERRED EMBODIMENT(S)

Figure 1:
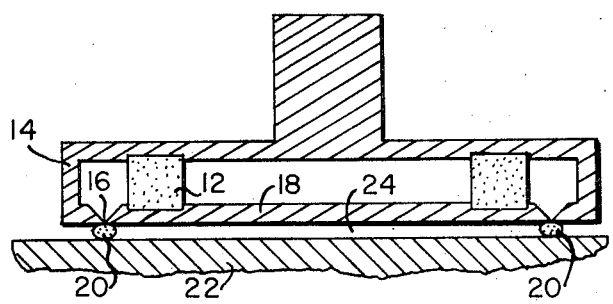
FIG. 1 is a sectional view of one embodiment of a thrust bearing having a fluid bearing pad.

FIG. 1 is an illustration such as set forth in my copending application of a bearing which includes a ring magnet 12 magnetized across the face, which produces magnetic induction which is conducted by a cup pole piece 14 which focuses the lines of magnetic flux to an intense value at an annular gap 16. The gap is formed by the undercut portion of the pole piece to provide a greater fringing condition. The flux traverses the gap and returns to the magnet via the flat pole piece 18. A magnetic fluid 20 may include those magnetic fluids which comprise a carrier fluid such as water, hydrocarbons, fluorocarbons, etc., a surface active agent, such as fatty acids, for example a monounsaturated fatty acid, like oleic acid, and any magnetic-type particles like ferrous materials, such as ferrites, chromium dioxides, magnetite, etc., and is introduced into the gap and is evenly distributed in a ring defined by the fringing field of the gap with the rim of the fluid extending outwardly from the bottom face as shown.

The thrust bearing as shown is laid on a flat nonmagnetic surface 22 with the result that a pad of air of fluid-bearing pad 24 is trapped within the enclosure defined by the nonmagnetic surface 22, the flat pole piece 18, and the peripheral ring of sealing magnetic fluid 20. As shown in FIG. 1, the trapped fluid, such as air, creates a net support force when it is compressed as by a small displacement, and it allows rotative and lateral movement of the surface 22 with respect to the surface 18 without contact between the moving surfaces. In this embodiment, if the displacement motion between the surface 22 and the thrust bearing is substantial enough, the pressure generated by the bearing pad becomes such that the magnetic fluid 20 is deformed and the deformation may tend to destroy the integrity of the fluid seal which defines the bearing pad.

Figure 2:
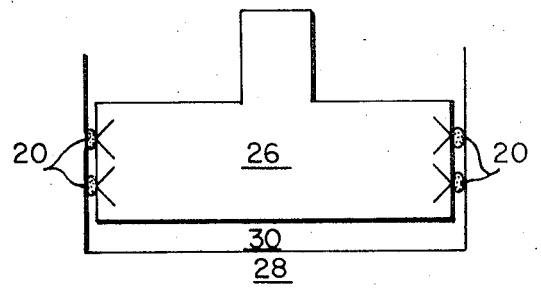
FIG. 2 is a sectional view of one embodiment of the invention.

Referring to FIG. 2 a bearing arrangement is shown wherein a piston 26 is disposed within a cylinder 28. Magnetic fluid 20 is positioned in two ring-like configurations by peripheries of magnetic flux at the outer surface of the piston 26 to provide annular magnetic fluid seals to seal a bearing pad 30 in the space defined by the outer surface of the piston, the inner surface of the cylinder wall, and the magnetic fluid. In this embodiment, displacement of the piston upward or downward along an axis normal to the bottom surface of the piston produces expansion or compression of captured fluid changing the pressure and providing an axial restoring force and therefore a load-carrying bearing action. This particular embodiment is advantageous compared to the embodiment of FIG. 1 in that the displacement motion does not deform the magnetic fluid, and therefore, the integrity of the magnetic fluid seal is maintained.

Figure 3:
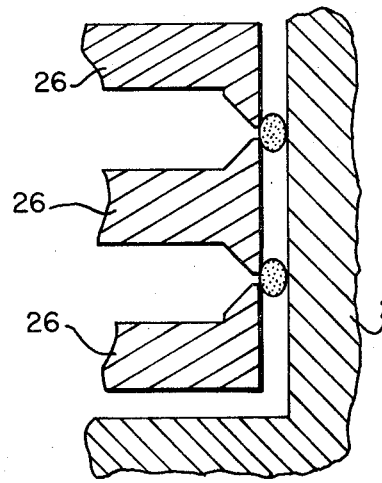
FIG. 3 is an exploded sectional view of a portion of FIG. 2.

FIG. 3 is an exploded view of a portion of FIG. 2 wherein the wall of the piston 26 has been cut away to define knife-type edges to concentrate the magnetic flux provided by a magnetic source (not shown).

Figure 4:
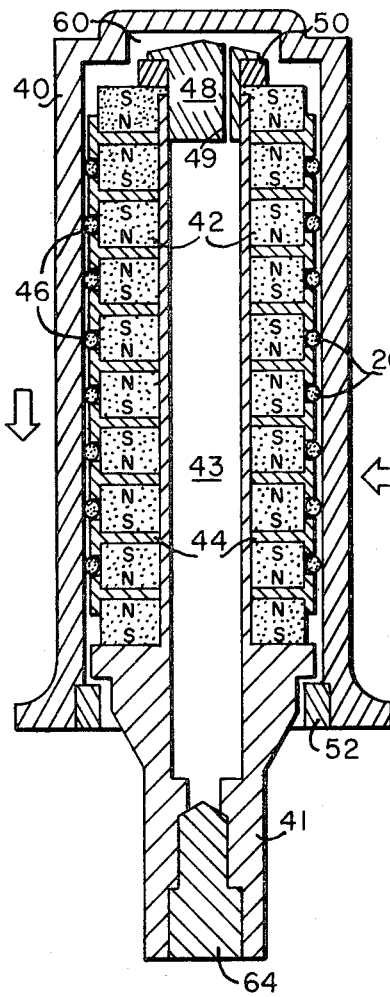
FIG. 4 is a sectional view of another embodiment of the invention.

In FIG. 4 a preferred embodiment of the invention, which may be used as a textile spindle bearing, is shown wherein a housing 40 is spaced apart from a pin 41. The pin is characterized by a central bore 43 and has a series of annular bucking magnets 42. Associated with the magnets are pole pieces 44 defining gaps 46 at the ends thereof. The pole pieces in this particular configuration, in addition to establishing zones of magnetic flux, provide for dimensional control. At the zones magnetic fluid 20 is positioned to define a plurality of magnetic fluid zones or rings between the outer wall of the pin and the inner wall of the housing. Received in the end of the bore 43 is a stop 48, having an air passage 49, with a washer 50. A retainer ring 52 is secured to the inner wall of the housing and an air valve (needle valve) 64 is disposed at the bottom portion of the pin. The retainer ring 52 and stop 48 are structured to limit the movement of the pin within the housing. This prevents unwanted mechanical movement between the pin and the housing, such as during shipping and assembly and further the retainer ring additionally prevents or inhibits blow out. During normal operation, the surfaces of the pin and housing do not contact. However, the assembly may be subjected to excessive vibration or overload either continuous or discontinuous during operation; and if the excessive overload continues, then, of course, the retainer ring or stop are engaged to limit any further movement between the pin and the housing.

In the assembly of the embodiment of FIG. 4, magnetic fluid 20 is positioned in the gaps 46 wherein the magnetic fluid will form a series of rings at the gaps. The needle valve would be opened and the pin 41 inserted within the housing, the passage 49 allowing for pressure equalization. Of course, the needle valve may be disposed at either end of the assembly and any other structure or device may be used to ensure that pressure equalization during assembly is maintained. The retainer ring 52 would then be inserted and the needle valve closed. The stop 50 serves the same function as the retainer ring, that is, to prevent unwanted movement of the pin and housing when not in actual use or when the bearing assembly is subjected to an overload. As shown, the housing 40 is supported by the air bearing pad 60 which bearing pad extends across the top of the pin and partially down the side to provide thrust support. When a radial force is applied to the housing and the assembly is static, then the magnetic fluid rings provide a restoring force to maintain the position of the pin and the housing, such that their surfaces do not contact one another.

When rotating or in a dynamic state, in addition to the restoring force provided by the magnetic fluid rings, some radial restoring force may also be provided by the hydrodynamic action of the magnetic fluid rings and the sleeve-like fluid pads that are defined between the magnetic fluid rings. When an offsetting force is applied, the fluid in the sleeve-like pads which are defined between the outer surface of the pin and the inner surface of the housing and the rings, will flow to the area of increased volume created by the offsetting force. When the housing and pin are used as a textile bearing, the end of the pin is secured such as to a frame and the threaded or other fiber(s) is disposed about the outer surface of the housing, and, of course, movement of the thread will cause rotation of the housing with respect to the pin.

Figure 5:
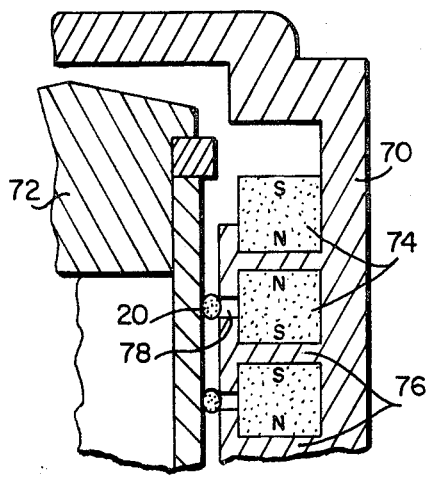
FIG. 5 is a sectional view of an alternative embodiment.

In FIG. 5 is shown an alternative embodiment of FIG. 1 wherein a housing 70 has disposed therein a plurality of bucking magnets 74 with associated pole pieces 76 which pole pieces define gaps 78. Magnetic fluid is positioned in the gaps and the fluid contacts the outer surface of the pin 72.

Figure 6:
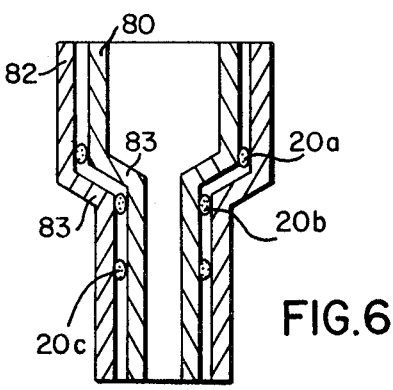
FIG. 6 is a sectional view of a further alternative embodiment of the invention.

A further alternative embodiment of the invention is shown in FIG. 6 wherein an inner race 80 is shown in combination with an outer race 82 both having extended surfaces 83. This embodiment provides a complete bearing wherein two annular magnetic fluid rings 20a and b define a fluid bearing pad between the inner and outer races whereby any displacement motion between the inner and outer races would be offset by the pneumatic action of the bearing pad defined between the extended surfaces 83 of the inner and outer races as shown. The angle at which the extended surface area is formed may be at any angle as long as the fluid support pad sealed therein is adapted to provide a pneumatic action in response to a thrust force. The zone of magnetic fluid 20c, as in the preferred embodiment, provides a radial restoring force. If desired, additional rings such as 20c may be employed.

The preferred embodiment has been described wherein the magnetic fluid which seals the bearing pad is disposed on the side wall of the pin. If desired this magnetic fluid may be placed on the facing surface such as shown in FIG. 1. Further, this magnetic fluid seal when sealing the air pad may assume various configurations and/or define multi-bearing pads as disclosed in my copending application. Further, the same or different magnetic fluids may be used to seal the bearing pad and for the zones of magnetic fluid.

The magnetic fluid rings which are employed to provide the radial support may also assume other configurations, such as elliptical, sinusoidal, etc. The magnetic fluids have been shown as positioned on or at and equally spaced along the outer surface of the pin. The magnetic fluid rings may be nonuniformly spaced and they may be positioned along the inner surface of the housing or on both the inner and outer surfaces of the housing and the pin.

The zones of magnetic fluid have been shown in ring-like configurations in order to serve the dual function of radial restoration and to provide a multi-stage seal for the fluid bearing pad. The magnetic fluid rings do not have to extend for a complete periphery on either of the surfaces but may assume any noncontinuous configuration on the outer surface of the pin or the inner surface of the housing. Since it is the magnetic fluid which is providing the radial restoring force, it is not necessary that this magnetic fluid provide a complete periphery to seal a bearing pad. Thus, the preferred embodiment as shown in FIG. 4 could be modified by creating a plurality of segmented zones of magnetic fluid, either uniformly or in random arrangement on the surface of the housing rather than ring-like configurations such as in interrupted ring-like configurations. These zones may comprise a series of short or elongated, straight or curved, parallel or nonparallel lines, either perpendicular or parallel to or at any angle to the axis of rotation. They may form a plurality of arcuate or nonstraight line configurations or wave form configurations on the surface of the pin and be uniformly or randomly arranged thereon. The zones of magnetic fluid may be disposed entirely on one surface such as the outer surface of the pin, entirely on the inner surface of the housing, or disposed on both surfaces.

The zones of magnetic fluid may be used in lieu of the sealed bearing pad 60 wherein the magnetic fluid will provide a restoring force to thrust forces; and bearing pads may be sealed between the surfaces of the pin and housing as described in my copending application. Or alternatively, entire thrust and radial support between the pin and housing may be accomplished by a plurality of magnetic fluid zones without any sealed fluid bearing pads at all.

Any type of permanent magnetic material may be used with my novel bearings. For example, aluminum, nickel, cobalt compounds, such as Alnico V and VIII; cobalt-samarium materials; rubber-bonded magnets; ceramics and other iron-containing materials, such as magnetite and ferrite, may also be used. In addition, the pole pieces to which the magnetic flux passes have been described in regard to a material capable of being soft magnetically or being very responsive to magnetism; that is, being capable of high magnetic saturation although having no inherent magnetic characteristics of their own. For example, ferrous materials such as iron, cast iron, etc., may be used as well as iron alloys such as 400 Series stainless steel. At least one of the surfaces has been described as being nonmagnetic and this would include plastic, glass, ceramics, nonmagnetic stainless steel, aluminum, etc.

The gaps have been described as being defined by either the annular knife edges or by the pole pieces shown in FIG. 4. Any configuration may be used which provides a zone or periphery of magnetic flux along a surface. If desired, the permeable pole pieces may be eliminated and solely magnetic sources, such as a plurality of annular bucking magnetic rings per se, may be used to provide the zones for the positioning of the magnetic fluid or for the periphery of magnetic fluid.

The preferred embodiment, in addition to application as a textile spindle bearing, may also be used on phonograph turntable bearings, computer disc drives, motor bearings for silent blowers, etc.

Having described my invention, what I now claim is:
1. A bearing assembly which comprises:
   a. a housing having an inner surface;
   b. a pin having an outer surface and received within the housing the outer surface of the pin spaced apart from the inner surface of the housing;
   c. means to provide a periphery of magnetic flux disposed on one of said surface;
   d. a first magnetic fluid positioned along said periphery and contacting the other of said surfaces in sealing relationship;
   e. a bearing pad sealed between the inner and outer surfaces and within the periphery of the magnetic fluid to provide a fluid support pad therebetween;
   f. means to form a zone of magnetic flux on one of said surfaces, said means external of the periphery of the first magnetic fluid and the bearing pad; and g. a second magnetic fluid positioned at said zone to provide a restoring force in response to a force acting on either the housing and/or the pin.

2. The bearing of claim 1 wherein the zone includes a plurality of peripheries of magnetic flux disposed on one of said surfaces and wherein magnetic fluid is positioned along each of said peripheries to provide a plurality of ring-like magnetic fluid seals between said surfaces.

3. The bearing of claim 2 wherein the means to establish the peripheries of magnetic flux include a plurality of annular magnets in combination with pole pieces.

4. The bearing of claim 3 wherein the pole pieces define annular gaps on said surface.

5. The bearing of claim 4 wherein said gaps are defined on the outer surface of the pin.

6. The bearing of claim 4 wherein the gaps are defined on the outer surface of the pin in spaced apart parallel relationship.

7. The bearing of claim 4 wherein said gaps are defined on the inner surface of the housing.

8. The bearing assembly of claim 1 wherein either the inner surface of the housing or the outer surface of the pin is a nonmagnetizable surface, and the other surface a magnetic surface, and wherein a magnetic flux passes through the magnetic surface and a magnetic fluid, and returns through another portion of the magnetic surface.

9. The bearing assembly of claim 1 which includes means to limit the axial movement of the pin within the housing.

10. The bearing assembly of claim 1 which includes means to provide for pressure equilization within the housing during the assembly of the pin within the housing.

11. The bearing assembly of claim 1 wherein the housing is characterized by being sealed at one end thereof, and wherein the pin at such end is characterized by a shape to provide a stop at such end when force is applied to the pin, such stop preventing escape of fluid from the fluid-bearing pad.

12. A bearing assembly which comprises in combination:

a. a housing sealed at one end and characterized by an inner surface;

b. a pin characterized by an outer surface and positioned within the housing, the outer surface of the pin spaced slightly apart from the inner surface of the housing, the pin and housing adapted for movement relative to one another;

c. a plurality of annular magnets and pole pieces disposed on one of the said surfaces to provide a plurality of peripheries of magnetic flux, the magnets and pole pieces defining gaps therebetween;

d. a first magnetic fluid positioned along one of the peripheries and contacting the other said surface in a sealing relationship;

e. a bearing pad sealed between the inner and outer surfaces, and within the periphery of the first magnetic fluid to provide a fluid-support pad therebetween, the support pad extending about the sealed end of the housing so as to restrain the pin from contacting the sealed end of the housing during normal operation of the bearing;

f. a second magnetic fluid positioned along the other peripheries formed by the annular magnets and pole pieces, the second magnetic fluid external of the periphery of the first magnetic fluid and bearing pad, and the second magnetic fluid adapted to provide a restoring force in response to the force acting on either the housing or the pin, or both;

g. means to limit axial movement of the pin within the housing; and h. means to provide for pressure equilization between the air in the bearing pad and the external air pressure of the housing during assembly of the pin within the housing, whereby the air-support pad sealed by the first magnetic fluid at the one end of the housing provides for a support of the pin within the housing, while the second magnetic fluid in combination with the first magnetic fluid provides for a restoring force to maintain the position of the pin and housing such that the surfaces do not contact each other during relative movement in respect to each other.

13. The bearing assembly of claim 12 wherein the second magnetic fluid extends in at least one peripheral sealing relationship about the periphery of the pin.

14. The bearing assembly of claim 12 wherein the end of the pin adjacent the sealed end of the housing includes a head shaped in a convexed manner to function as a mechanical stop when the pin head moves into contact with the sealed end of the housing, thereby preventing an axial force applied to the pin from forcing nonmagnetizable fluid from the support pad.

15. The bearing assembly of claim 12 which includes a mechanical stop means at one end of the pin and a retaining means at the other end of the pin to limit axial movement of the pin within the housing.

16. The bearing assembly of claim 12 wherein the means to provide for pressure equilization includes a valve adapted to be open during assembly so as to permit air in the air-support pad entrapped between the inner and outer surfaces of the pin and the housing to be discharged, the valve adapted to be closed after assembly to maintain a sealed air-support pad.

17. The bearing assembly of claim 12 wherein the inner surface of the housing or the outer surface of the pin comprises a nonmagnetic surface, while the other surface is a magnetic surface, and wherein the magnetic flux from the annular magnets passes through the magnetic surface and the first and second magnetic fluids.

18. The bearing assembly of claim 12 wherein the means to provide pressure equilization includes a pin characterized by a central air flow passage therein, an air passage at one end of the pin in fluid-flow communication between the central flow passage and the air-support pad and a valve in fluid-flow communication with the central flow passage.

19. The bearing assembly of claim 12 wherein the plurality of peripheries of magnetic flux are positioned in substantially parallel spaced apart sequential peripheries about the pin to place the second magnetic fluid in a plurality of sealing relationships between the inner and outer surfaces.

20. A bearing assembly which comprises in combination:

a. a housing sealed at one end and characterized by an inner surface;

b. a pin characterized by an outer surface and positioned within the housing, the outer surface of the pin spaced slightly apart from the inner surface of the housing, the pin and housing adapted for movement relative to one another, one of said surfaces being a magnetic surface, and the other of such surfaces being a nonmagnetic surface;

c. a plurality of annular magnets and pole pieces disposed on the magnetic surface to provide a plurality of substantially parallel spaced apart peripheries of magnetic flux, the magnets and pole pieces defining gaps therebetween, and defining at least a first magnetic flux periphery and a second magnetic flux periphery;

d. a first magnetic fluid positioned along the first magnetic flux periphery and contacting the nonmagnetic surface in a sealing relationship;

e. a bearing pad formed and sealed between the inner and outer surfaces along the periphery of the first magnetic fluid formed by said fluid to provide an air-support pad therebetween, the support pad extending and including the sealed end of the housing so as to restrain the pin from contacting the sealed end of the housing during normal operation of the bearing assembly;

f. a second magnetic fluid positioned along the second peripheries and contacting the nonmagnetic surface in a plurality of sealing relationships, the second magnetic fluid external of the periphery of the first magnetic fluid and bearing pad, the second magnetic fluid adapted to provide a restoring force in response to the force acting on either the housing or the pin;

g. means to limit the axial movement of the pin within the housing; and h. means to provide for equilization of pressure within the pin and the housing during assembly.

21. A bearing assembly which comprises:

a. a first element having a first surface;

b. a second element having a second surface spaced apart from and facing the first surface, said surfaces adapted for relative movement in respect to each other, one of said surfaces being magnetic and the other being nonmagnetic;

c. a first magnet means on the magnetic surface to provide a first periphery of a first magnetic flux along said magnetic surface;

d. a first magnetic fluid positioned along said first periphery, the magnetic fluid contacting the other nonmagnetic surface in a sealing relationship;

e. a fluid-bearing pad formed by the first magnetic fluid and the first magnetic flux and sealed between said surfaces and the periphery of the first magnetic fluid;

f. a second magnet means on the magnetic surface to provide at least one second periphery of a second magnetic flux along said surface, said second magnetic flux external of the periphery of the first magnetic fluid and the flux; and g. a second magnetic fluid positioned along the second magnetic flux, said second magnetic fluid providing a restoring force when a force acts on either of said surfaces, the peripheries of the first and second magnetic flux passing solely through the magnetic surface and the first and second magnetic fluid.

22. The bearing assembly of claim 21 wherein the second magnetic flux comprises a plurality of magnetic fluxes arranged in a generally parallel spaced apart relationship along said surface, the second magnetic fluid positioned along the second magnetic fluxes and contacting the other surface in a sealing relationship, thereby providing a bearing assembly having a multiseal effect.

23. The bearing assembly of claim 21 wherein the first and second elements comprise an outer surface of a cylindrical piston and the inner surface of a piston cylinder, the fluidbearing pad sealed within the first magnetic flux and first magnetic fluid encompassing the surface of the piston head.

24. The bearing assembly of claim 21 wherein the first and second elements comprise elements having extended, but generally parallel, angular surfaces.

25. A method for providing a bearing assembly which includes:

a. providing a first element having a first surface;

b. providing a second element having a second surface, spaced apart from the first surface;

c. establishing a first periphery of magnetic flux along one of said surfaces;

d. positioning a first magnetic fluid along said periphery of magnetic flux;

e. contacting the other of said surfaces in sealing relationship with the magnetic fluid;

f. sealing a fluid-bearing pad between the surfaces and the periphery of the first magnetic fluid;

g. establishing a zone of magnetic flux on one of said surfaces external of the first periphery of magnetic flux and the bearing pad; and h. positioning a magnetic fluid at said zone, the magnetic fluid adapted to provide a radial restoring force when a force acts on either of said surfaces.

* * * * *